United States Patent
Sato

(10) Patent No.: US 10,615,728 B2
(45) Date of Patent: Apr. 7, 2020

(54) MOTOR CONTROL DEVICE AND MOTOR CONTROL METHOD

(71) Applicant: Panasonic Intellectual Property Management Co., Ltd., Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/074,684

(22) PCT Filed: Feb. 8, 2017

(86) PCT No.: PCT/JP2017/004482
§ 371 (c)(1),
(2) Date: Aug. 1, 2018

(87) PCT Pub. No.: WO2017/145749
PCT Pub. Date: Aug. 31, 2017

(65) Prior Publication Data
US 2019/0044466 A1    Feb. 7, 2019

(30) Foreign Application Priority Data
Feb. 25, 2016    (JP) .................... 2016-033887

(51) Int. Cl.
*H02P 21/00*    (2016.01)
*H02P 21/22*    (2016.01)
(Continued)

(52) U.S. Cl.
CPC .......... *H02P 21/0003* (2013.01); *H02P 21/22* (2016.02); *H02P 27/04* (2013.01); *H02P 29/00* (2013.01)

(58) Field of Classification Search
CPC ....... H02P 21/0003; H02P 21/22; H02P 21/04
(Continued)

(56) References Cited

U.S. PATENT DOCUMENTS 6,809,492 B2 * 10/2004 Harakawa .............. H02P 21/22
                                                     318/603
7,772,790 B2 *  8/2010 Nashiki .................. H02K 1/145
                                                     318/400.02

(Continued)

FOREIGN PATENT DOCUMENTS

JP    11-027996    1/1999
JP    2008-043058    2/2008
(Continued)

OTHER PUBLICATIONS

International Search Report of PCT application No. PCT/JP2017/004482 dated Apr. 18, 2017.

*Primary Examiner* — Erick D Glass
(74) *Attorney, Agent, or Firm* — McDermott Will & Emery LLP

(57) ABSTRACT

In a motor control device, a two-phase/three-phase converter is configured to convert a d-axis voltage instruction and a q-axis voltage instruction into voltage instructions in UVW phases. A PWM circuit is configured to generate drive pulse signals having undergone power width modulation, in accordance with the voltage instructions. An inverter is configured to generate drive voltages for driving coils based on the drive pulse signals. A position detector is configured to detect a rotational position. A rotational speed calculator is configured to calculate a rotational speed. A current detector is configured to detect drive currents flowing into the coils. A three-phase/two-phase converter is configured to convert detected drive current values into a d-axis current value and a q-axis current value. A d-axis voltage instruction generation unit is configured to acquire a difference between the d-axis current value and a d-axis current instruction having a predetermined value, and to generate the d-axis voltage instruction based on PI computation performed on the difference. A q-axis voltage instruction generation unit is
(Continued)

configured to acquire a difference between a speed instruction and the rotational speed calculated by a rotational speed calculation unit, and to generate the q-axis voltage instruction based on PI computation performed on the difference.

6 Claims, 4 Drawing Sheets

(51) Int. Cl.
*H02P 27/04* (2016.01)
*H02P 29/00* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 2014/0292239 A1* | 10/2014 | Kato | ................... | H02P 21/0017 318/400.02 |
| 2014/0300306 A1* | 10/2014 | Kato | ................... | G01D 5/208 318/490 |
| 2016/0181960 A1* | 6/2016 | Hattori | ................... | H02P 21/00 318/400.02 |

FOREIGN PATENT DOCUMENTS

| JP | 2009-185915 | 8/2009 |
|---|---|---|
| JP | 2010-041748 | 2/2010 |

\* cited by examiner

MOTOR CONTROL DEVICE AND MOTOR CONTROL METHOD

TECHNICAL FIELD

The present invention relates to motor control devices and motor control methods for performing rotation controls on motors, and in particular, relates to a motor control device and a motor control method capable of performing a precise rotation control on a motor even in a lower torque, lower speed condition.

BACKGROUND ART

As a method for controlling a current for a motor equipped with a permanent magnet, a vector control is known. Under the vector control, a current for a motor is separated and controlled into a q-axis current component contributing to torque and a d-axis current component orthogonal to the q-axis current component.

Such a motor control device has been proposed that is capable of performing a precise motor control even when precision in detecting a current lowers in a lower torque, lower speed condition under a conventional vector control (e.g., see PTL 1). FIG. 4 is a block diagram including conventional motor control device 90 appropriate for such a rotation control in a lower torque, lower speed condition.

Conventional motor control device 90 illustrated in FIG. 4 is configured to utilize, as a rotation control unit, vector control unit 92 based on the current vector control in a dq-axis coordinate system, described above, to perform a rotation control on motor 40. In FIG. 4, motor control device 90 is configured to detect drive currents for motor 40 with current detector 12. Detected current detection values Iu, Iv, and Iw are converted by three-phase/two-phase converter 13 configured to perform coordinate conversion into currents in the dq coordinate system, i.e., d-axis current Id and q-axis current Iq. The currents are then supplied to vector control unit 92. Position detector 14 is configured to calculate rotational position Pd indicative of a rotor position of motor 40 based on a signal sent from position detection sensor 49. Rotational speed calculator 15 is configured to calculate and supply, to vector control unit 92, rotational speed Sdet of motor 40 based on rotational position Pd. Vector control unit 92 is further externally supplied with speed instruction Sref instructing a motor speed.

Vector control unit 92 is configured to perform processes described below based on the supplied signals to calculate an instruction voltage for motor drive unit 30. That is, vector control unit 92 first calculates difference dS between speed instruction Sref and rotational speed Sdet. Next, PI computation unit 22 performs proportional integral (PI) computation on difference dS to calculate a torque instruction. From the torque instruction, q-axis current instruction Iq* is further acquired. Difference dIq between q-axis current instruction Iq* and q-axis current Iq is then acquired. PI computation unit 25 performs PI computation on difference dIq to determine and output q-axis voltage instruction Vq* representing a control instruction on a q-axis. On the other hand, d-axis current instruction Id* is specified with a value of "0", and difference dId between d-axis current instruction Id* and d-axis current Id is acquired. PI computation unit 26 performs PI computation on difference dId to determine and output d-axis voltage instruction Vd* representing a control instruction on a d-axis.

Two-phase/three-phase converter 27 converts q-axis voltage instruction Vq* and d-axis voltage instruction Vd* output from vector control unit 92 into voltage instructions Dru, Drv, and Drw in three phases. Voltage instructions Dru, Drv, and Drw in the three phases are then supplied to pulse width modulation (PWM) circuit 31 of motor drive unit 30. With PWM signals in the UVW phases, which are generated by PWM circuit 31, inverter 32 is controlled to generate and output, to motor 40, drive voltages Vou, Vov, and Vow.

Conventional motor control device 90 illustrated in FIG. 4 further includes, in addition to the ordinary configuration based on the current vector control, described above, offset angle adjustment unit 95 and adder 96, as illustrated in FIG. 4, for a precise motor control. When three-phase/two-phase converter 13 performs coordinate conversion on current detection values Iu, Iv, and Iw, motor control device 90 uses offset angle adjustment unit 95 and adder 96 to add offset angle P of relative to coordinate conversion phases of the currents.

Conventional motor control device 90 added with the above described configuration refrains how torque is to be generated, increases a current for generating identical torque in magnitude as a result, and increases a signal-to-noise (S/N) ratio with respect to a control instruction. In other words, by adding offset angle Pof, less torque is generated than torque instructed by a torque instruction. This leads to an increased torque instruction in order to generate torque at a magnitude similar or identical to a magnitude of torque generated when offset angle Pof is not added. A more current flows accordingly. As a result, precision in detecting the current improves. Conventional motor control device 90 with the above described configuration can perform a precise motor control even when precision in detecting a current lowers in a lower torque, lower speed condition, for example.

Vehicles in which an idle-stop control takes place for improved fuel efficiency are increasing in recent years, for example. In such a vehicle, in addition to an ordinary oil pump that is driven by an engine when the vehicle runs, an electric oil pump that operates during an idle-stop period is also utilized. That is, while the vehicle is stopping and the idle-stop control is taking place, the electric oil pump is driven by a motor to supply hydraulic pressure. A hydraulic pressure force is thus secured while the vehicle is at standstill.

Hydraulic oil used in a hydraulic pump system of a vehicle greatly changes in viscosity due to a temperature. A motor control is required for an electric oil pump so that hydraulic pressure in accordance with a change in oil temperature can be acquired. For example, viscosity of hydraulic oil rises at a lower temperature. A load increases accordingly. Torque greater in magnitude than torque at a normal temperature is thus required. On the other hand, the viscosity of the hydraulic oil lowers at a higher temperature. A load almost disappears accordingly. Even smaller torque can thus secure predetermined hydraulic pressure. In addition, a required flow amount of hydraulic oil during the idle-stop period may be less than a required flow amount of hydraulic oil while the vehicle is running. It is thus advantageous that the motor should rotate at a lower speed during the idle-stop period.

When a temperature is higher during the idle-stop period, a motor of an electric oil pump is required to allow hydraulic oil at lower viscosity, i.e., in an almost no-load condition, to flow at a super low speed. As a result, only a minute current amount is required to properly drive the motor. That is, for a motor of an electric oil pump used in a vehicle and for a motor control device, a motor control capable of performing a precise rotation control even in a lower speed, no-load condition is important. Such a motor control is required that is precise enough even in a lower torque, lower speed condition, as described above.

To satisfy the above described demands on electric oil pumps, such a motor control device has conventionally been proposed that is configured to control a motor so that a rotational speed and torque in accordance with a change in oil temperature are properly acquired (e.g., see PTL 2). The conventional motor control device includes means of generating a control instruction, which is configured to output a q-axis current instruction to a motor, for example. The motor control device controls motor torque and limits a motor rotational speed based on oil temperature information to allow the motor to acquire a rotational speed and torque required by the electric oil pump.

As means of refraining voltage saturation in a vector control, such a flux weakening control is conventionally known that refrains an increase in induced voltage (e.g., see PTL 3). The flux weakening control is implemented with a procedure described below, for example. That is, the control first calculates instruction voltage amplitude value |V*| from instruction voltages Vq*, Vd*, uses a subtractor to subtract instruction voltage amplitude value |V*| from maximum voltage Vlimit, and then calculates voltage error dV*. Next, the control uses a proportional integral controller for flux weakening control to calculate magnetic flux instruction current Idf*, and then adds magnetic flux instruction current Idf* to d-axis instruction current Idx* to perform a flux weakening control.

CITATION LIST

Patent Literature

PTL 1: Unexamined Japanese Patent Publication No. 2008-43058
PTL 2: Unexamined Japanese Patent Publication No. 2009-185915
PTL 3: Unexamined Japanese Patent Publication No. H11-27996

SUMMARY OF THE INVENTION

A motor control device according to the present invention is configured to perform a rotation control on a motor including a stator including coils in three, UVW phases of a U phase, a V phase, and a W phase, and a rotor that is rotatably disposed so as to face the stator and that holds permanent magnets, by utilizing a dq-axis coordinate system including a d-axis corresponding to a magnetic pole position direction of the permanent magnets and a q-axis orthogonal to the d-axis. This motor control device includes a two-phase/three-phase converter, a PWM circuit, an inverter, a position detector, a rotational speed calculator, a current detector, a three-phase/two-phase converter, a d-axis voltage instruction generation unit, and a q-axis voltage instruction generation unit. The two-phase/three-phase converter is configured to receive a d-axis voltage instruction and a q-axis voltage instruction as voltage instruction values on the dq-axis coordinate, at which voltages are to be applied to the coils, and to convert the d-axis voltage instruction and the q-axis voltage instruction into drive voltage instructions in the UVW phases. The PWM circuit is configured to generate drive pulse signals in the UVW phases, which have undergone pulse width modulation per phase, in accordance with the supplied drive voltage instructions in the UVW phases. The inverter is configured to generate drive voltages in the UVW phases for driving the coils per phase based on the supplied drive pulse signals in the UVW phases. The position detector is configured to detect a rotational position of the rotor. The rotational speed calculator is configured to calculate a rotational speed of the rotor. The current detector is configured to detect drive currents flowing into the coils in the UVW phases. The three-phase/two-phase converter is configured to convert current values of the drive currents in the UVW phases, which are detected by the current detector, into a d-axis current value and a q-axis current value on the dq-axis coordinate. The d-axis voltage instruction generation unit is configured to generate the d-axis voltage instruction. The q-axis voltage instruction generation unit is configured to generate the q-axis voltage instruction.

The d-axis voltage instruction generation unit of this motor control device is further configured to acquire a difference between the d-axis current value and a d-axis current instruction having a predetermined value, and to generate the d-axis voltage instruction based on proportional integral (PI) computation performed on the difference. The q-axis voltage instruction generation unit is further configured to acquire a difference between a supplied speed instruction and the rotational speed calculated by the rotational speed calculator, and to generate the q-axis voltage instruction based on PI computation performed on the difference.

A motor control method for this motor control device includes a step of acquiring a difference between a d-axis current value and a d-axis current instruction having a predetermined value, and of generating a d-axis voltage instruction based on PI computation performed on the difference, a step of acquiring a difference between a supplied speed instruction and a calculated rotational speed, and of generating a q-axis voltage instruction based on PI computation performed on the difference, and a step of converting the d-axis voltage instruction and the q-axis voltage instruction into drive voltage instructions in the UVW phases.

With this configuration, a q-axis voltage instruction is generated based on a speed deviation representing a difference between a speed instruction and a rotational speed calculated by the rotational speed calculator. On the other hand, in the ordinary vector control described in PTL 1, a q-axis voltage instruction is generated based on a difference between a q-axis current instruction and a q-axis current, for example.

That is, when a conventional vector control is utilized for rotation drive in a no-load, lower speed condition, only a minute amount of a q-axis current is to be detected. A current is required to be highly precisely detected to secure precise rotation controls. In addition, as a current reduces, an S/N ratio degrades, leading to an increase in negative effects of noise. A measure against noise is further required, for example.

On the other hand, in the present invention, a level of signals output from sensors for detecting positions and speeds used to calculate a rotational speed does not so lower, different from a q-axis current, even when rotation drive is performed in a no-load, lower speed condition. In the present invention, neither precision of a speed deviation nor an S/N ratio degrade even in a no-load, lower speed condition, securing precision in a control at a level equivalent to a level in a control in a normal load, normal speed condition.

As described above, the motor control device and the motor control method according to the present invention generate a q-axis voltage instruction based on a speed deviation. Therefore, rotation can be controlled even in a no-load, lower speed condition without depending on a q-axis current that reduces to a minute amount in the no-load, lower speed condition. The present invention can provide the motor control device capable of performing a stable rotation control even in a no-load, lower speed condition.

DESCRIPTION OF EMBODIMENTS

With configurations, described later, a motor control device and a motor control method according to one exemplary embodiment of the present invention are capable of generating a q-axis voltage instruction based on a speed deviation, and of, even in a no-load, lower speed condition, performing a rotation control without depending on a q-axis current that reduces to a minute amount in the no-load, lower speed condition.

In other words, the conventional methods based on the above described techniques need to be improved in terms of the following points. That is, with the method described in PTL 1, for example, offset angle Pof can be utilized to improve precision in detecting a drive current in a lower torque, lower speed condition. The method, however, performs a control so that a current amount increases. With the method, power consumption increases, sacrificing efficiency.

Another possible method for improving precision in detecting a drive current in a lower torque, lower speed condition is a method under which a current detection circuit with higher precision in a wider detection area is mounted, and appropriate controls at a lower speed and a higher speed are switched, for example. With the method, however, control circuits and control processes appropriate for higher precision at both speeds are required, expanding a circuit scale and increasing a cost.

To solve this problem, a q-axis voltage instruction is generated based on a speed deviation in the exemplary embodiment. With the exemplary embodiment, a stable rotation control can be achieved even in a no-load, lower speed condition.

Motor control devices according to some exemplary embodiments of the present invention will now be described herein with reference to the accompanying drawings.

First Exemplary Embodiment

Figure 1:
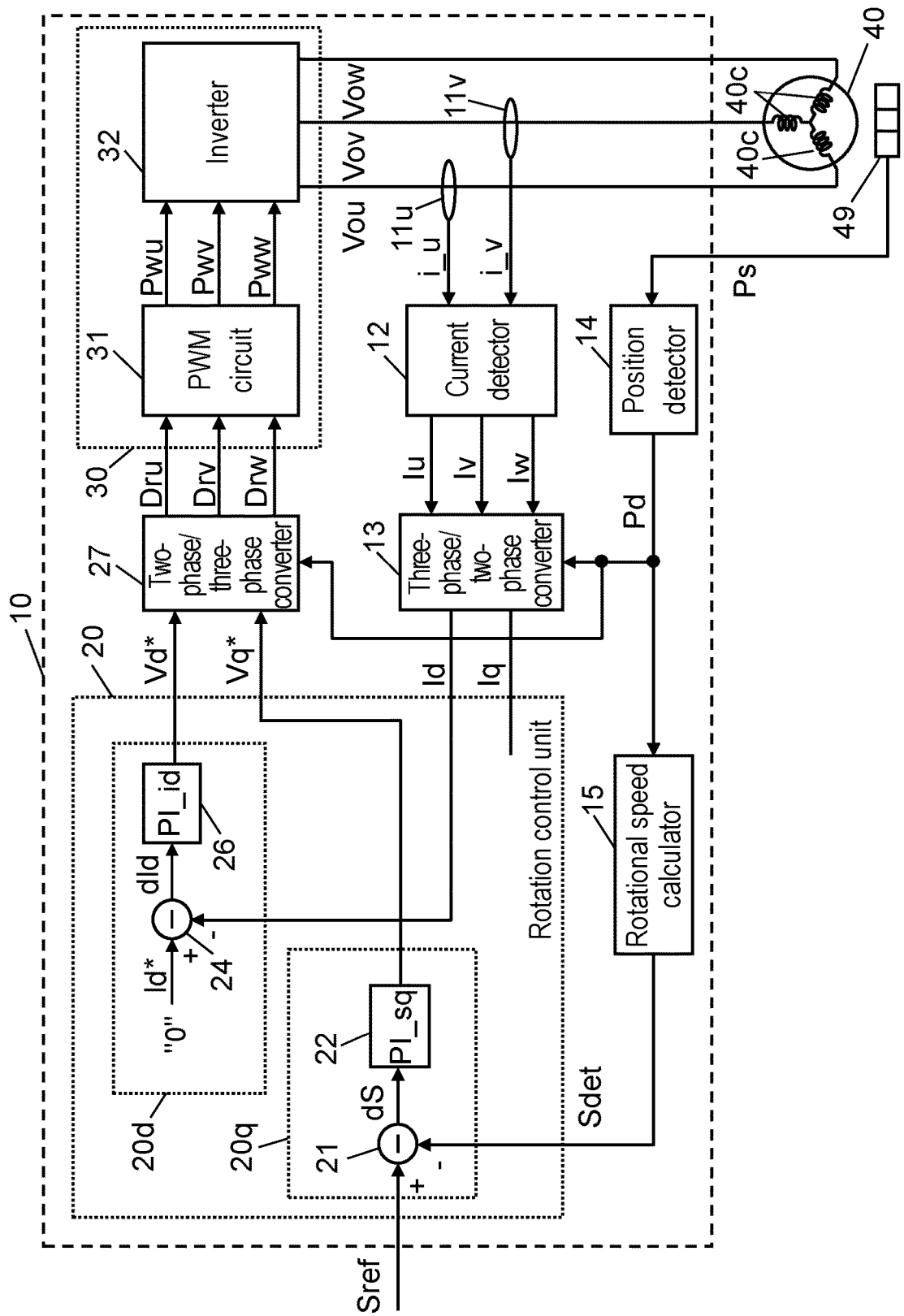
FIG. 1 is a block diagram illustrating a configuration of a motor control system including a motor control device according to a first exemplary embodiment of the present invention.

FIG. 1 is a block diagram of a motor control system including motor control device 10 according to a first exemplary embodiment of the present invention.

As illustrated in FIG. 1, the motor control system is configured to include motor control device 10 configured to control and power-drive motor 40, and position detection sensor 49 configured to detect a rotational position of a rotor of motor 40. Speed instruction Sref will be notified from an external higher controller to motor control device 10, for example.

In the exemplary embodiment, motor 40 is described as an example of a three-phase driven brushless motor. The three phases refer to a U phase, a V phase, and a W phase. That is, motor 40 that is the brushless motor includes the rotor and a stator. The rotor holds, around a shaft, permanent magnets in number satisfying a predetermined magnetic pole count. The stator is configured to include coils 40c in three phases, which are formed with wires winded around the stator core so as to correspond to the three phases. The rotor is rotatably disposed so as to face the stator. When respective drive voltage Vou, Vov, and Vow in the U phase, the V phase, and the W phase each separated at an angle interval of 120 degrees are applied to coils 40c in the UVW phases in motor 40 configured as described above, motor 40 is driven and rotated. The rotor thus rotates about the shaft.

To detect a rotational position of the rotor, position detection sensor 49, such as a hall element, is disposed around the rotor. Sensor signal Ps indicative of position information detected by position detection sensor 49 is supplied to motor control device 10.

In the exemplary embodiment, a current vector control is further utilized to perform a rotation control on motor 40 based on a dq-axis coordinate system including a d-axis corresponding to a magnetic pole position direction of the permanent magnets held by the rotor and a q-axis orthogonal to the d-axis. More specifically, on the d-axis, a current control is performed based on the current vector control for generating a d-axis voltage instruction by using an input as a d-axis current value. On the other hand, on the q-axis, a voltage control is performed based on a speed control for generating a q-axis voltage instruction by using an input as a rotational speed. The features will be described below in detail.

Next, a configuration of motor control device 10 that utilizes the current vector control as described above will be described.

As illustrated in FIG. 1, motor control device 10 includes two-phase/three-phase converter 27, motor drive unit 30, current detector 12, three-phase/two-phase converter 13, position detector 14, rotational speed calculator 15, and rotation control unit 20. Motor drive unit 30 includes pulse width modulation (PWM) circuit 31 and inverter 32. In the exemplary embodiment, motor control device 10 configured as described above generates drive voltages Vou, Vov, and Vow in the three phases based on drive voltage instructions Dru, Drv, and Drw in the three phases, respectively corresponding to voltage instructions Vd* and Vq* in two phases, to drive coils 40c at corresponding voltages. With this configuration, motor 40 is controlled and rotated so that the rotor rotates in accordance with drive voltages Vou, Vov, and Vow in the three phases.

To perform the rotation control as described above, sensor signal Ps is first supplied from position detection sensor 49 to position detector 14. Position detector 14 detects rotational position Pd of the rotor from supplied sensor signal Ps, and notifies rotational position Pd to two-phase/three-phase converter 27, three-phase/two-phase converter 13, and rotational speed calculator 15. Rotational speed calculator 15 calculates rotational speed Sdet of the rotor from an amount of change in supplied rotational position Pd within a unit period, and notifies rotational speed Sdet to rotation control unit 20.

Further, rotation control unit 20 is externally notified with speed instruction Sref, as well as is notified with d-axis current value Id and q-axis current value Iq from three-phase/two-phase converter 13. Rotation control unit 20 generates d-axis voltage instruction Vd* and q-axis voltage instruction Vq* as voltage instruction values on the dq-axis coordinate based on the notified information, and supplies d-axis voltage instruction Vd* and q-axis voltage instruction Vq* to two-phase/three-phase converter 27. Two-phase/three-phase converter 27 is further notified with rotational position Pd of the rotor from position detector 14. Two-phase/three-phase converter 27 utilizes rotational position Pd to perform coordinate conversion from two phases into three phases to convert the supplied voltage instructions in the two phases, which are d-axis voltage instruction Vd* and q-axis voltage instruction Vq*, into drive voltage instructions Dru, Drv, and Drw in three, UVW phases (hereinafter "Dru, Drv, and Drw" will be abbreviated and referred to as Dr_uvw, as required). Drive voltage instructions Dr_uvw in the three phases, as described above, are supplied to motor drive unit 30. One step performed by a program executing a motor control method may be configured to execute the function of two-phase/three-phase converter 27, and to convert d-axis voltage instruction Vd* and q-axis voltage instruction Vq* into drive voltage instructions Dr_uvw.

In motor drive unit 30, PWM circuit 31 generates per phase a voltage instruction signal corresponding to each of supplied drive voltage instructions Dr_uvw in the three phases. PWM circuit 31 then uses the generated voltage instruction signals as modulation signals to perform pulse width modulation on the generated voltage instruction signals. With this configuration, PWM circuit 31 supplies, to inverter 32, per phase, the voltage instruction signals as drive pulse signals Pwu, Pwv, and Pww in the three, UVW phases formed in columns of pulses having undergone pulse width modulation (hereinafter "Pwu, Pwv, and Pww" will be abbreviated and referred to as Pw_uvw, as required).

In motor drive unit 30, inverter 32 power-drives coils 40c per phase, based on supplied drive pulse signals Pw_uvw in the three phases. Inverter 32 includes, on each of the phases, a switch element on a positive polarity side of a power supply and a switch element on a negative polarity side. Upon the switch elements are turned on or off at pulse timings in accordance with drive pulse signals Pw_uvw, drive voltages Vou, Vov, and Vow in the three, UVW phases, which are formed with driving pulses (hereinafter "Vou, Vov, and Vow" will be abbreviated and referred to as Vo_uvw, as required), are supplied from corresponding drive outputs of the power supply, via the corresponding switch elements being turned on, to coils 40c. In another point of view, driving pulses are signals that have undergone pulse width modulation with voltage instruction signals. Inverter 32 therefore supplies, in an equivalent manner, drive voltages Vo_uvw corresponding to drive voltage instructions Dr_uvw to coils 40c to power-drive coils 40c.

Current amounts of drive currents for driving coils 40c under drive voltage instructions Dr_uvw in the three phases are detected by current sensor 11u and 11v as current detection signals i_u and i_v. The exemplary embodiment illustrates an example where current sensor 11u detects a current amount in the U phase as current detection signal i_u, while current sensor 11v detects a current amount in the V phase as current detection signal i_v. Current detection signals i_u and i_v are supplied to current detector 12. Current detector 12 calculates and supplies, to three-phase/two-phase converter 13, current detection values Iu, Iv, and Iw in the three, UVW phases (hereinafter "Iu, Iv, and Iw" will be abbreviated and referred to as I_uvw, as required) based on supplied current detection signals i_u and i_v.

Three-phase/two-phase converter 13 is notified with rotational position Pd of the rotor from position detector 14, in addition to current detection values I_uvw in the three phases. Three-phase/two-phase converter 13 utilizes rotational position Pd to perform coordinate conversion from three phases to two phases to convert supplied current detection values I_uvw in the three phases into current values in two phases, i.e., d-axis current value Id and q-axis current value Iq on the dq-axis coordinate. Current values Id and Iq in the two phases, as described above, are supplied to rotation control unit 20.

As described above, rotation control unit 20 is notified with rotational speed Sdet from rotational speed calculator 15, as well as externally notified with speed instruction Sref, in addition to d-axis current value Id and q-axis current value Iq. As illustrated in FIG. 1, rotation control unit 20 is configured to include d-axis voltage instruction generation unit 20d configured to generate d-axis voltage instruction Vd*, and q-axis voltage instruction generation unit 20q configured to generate q-axis voltage instruction Vq*.

In rotation control unit 20, d-axis voltage instruction generation unit 20d performs a current control based on the current vector control for generating d-axis voltage instruction Vd* by using an input as d-axis current value Id. In order to achieve the above described operation, d-axis voltage instruction generation unit 20d first causes subtractor 24 to calculate d-axis current deviation dId representing a difference between d-axis current value Id and d-axis current instruction Id* having a predetermined value. The exemplary embodiment is configured to specify d-axis current instruction Id* to a value of "0" so as to execute an "id=0 control". The above described configuration performs a control so that a current amount on the d-axis, which is not required for generating torque, becomes 0. Next, d-axis voltage instruction generation unit 20d causes PI computation unit 26 to perform proportional integral (PI) computation on calculated d-axis current deviation dId, and to generate d-axis voltage instruction Vd*. One step performed by a program executing a motor control method may be configured to execute the function of d-axis voltage instruction generation unit 20d to generate d-axis voltage instruction Vd*.

In rotation control unit 20, q-axis voltage instruction generation unit 20q performs a voltage control based on the speed control for generating q-axis voltage instruction Vq* by using an input as rotational speed Sdet. In order to achieve the above described operation, q-axis voltage instruction generation unit 20q first causes subtractor 21 to calculate speed deviation dS representing a difference between speed instruction Sref and rotational speed Sdet. Next, q-axis voltage instruction generation unit 20q causes PI computation unit 22 to perform a PI control based on proportional integral (PI) computation on calculated speed deviation dS, and to generate q-axis voltage instruction Vq*. In PI computation, with respect to a deviation of an input, a value acquired, as a proportional term, by performing a constant multiplication on the deviation with a power of Kp and a value acquired, as an integral term, by performing a constant multiplication on a value acquired by integrating the deviation with a power of Ki are added. One step performed by a program executing a motor control method may be configured to execute the function of q-axis voltage instruction generation unit 20q to generate q-axis voltage instruction Vq*.

In the exemplary embodiment, with rotation control unit 20 configured as described above, d-axis voltage instruction generation unit 20d operates so that a current on the d-axis, which does not contribute to torque, is controlled so as not to flow, while q-axis voltage instruction generation unit 20q operates so that a rotational speed of the rotor is controlled so as to follow speed instruction Sref. That is, under the rotation control on the q-axis, a voltage control based on generated q-axis voltage instruction Vq controls an amount of torque so that speed deviation dS between speed instruction Sref and rotational speed Sdet becomes "0". In the exemplary embodiment, the control executing the above described operation keeps a d-axis current to "0", while, on the q-axis, a minimum current required for satisfying a number of rotations in accordance with speed instruction Sref is achieved. With the exemplary embodiment, copper loss can be always kept to minimum, regardless of a load and a number of rotations, achieving higher efficiency.

In particular, in the exemplary embodiment, the above described configuration including rotation control unit 20 achieves a stable rotation control in a no-load, lower speed condition. That is, when a rotation control is performed in a lower torque, lower speed condition, i.e., in a no-load, lower speed condition, only a minute amount of a drive current flows from inverter 32 to coils 40c, as described above. This reduces amplitude of current detection signals i_u and i_v respectively detected by current sensors 11u and 11v. As a result, an S/N ratio between d-axis current value Id and q-axis current value Iq lowers. In performing an ordinary current vector control based on d-axis current value Id and q-axis current value Iq both showing smaller amplitude, as described above, precision in the control also degrades.

Instead of the above described ordinary current vector control, the exemplary embodiment utilizes, for a control on the q-axis, rotational speed Sdet generated based on sensor signal Ps sent from position detection sensor 49. Current detection signals i_u and i_v change in amplitude in accordance with torque and a rotational speed, as described above. Sensor signal Ps, however, obviously does not change in amplitude in accordance with torque and a rotational speed. That is, under the control on the q-axis by utilizing rotational speed Sdet, as described in the exemplary embodiment, precision in detecting a position and rotational speed Sdet does not degrade even when a rotation control is performed in a no-load, lower speed condition. In addition, the exemplary embodiment configured to execute the speed control on the q-axis, as described above, can further perform a rotation control in a higher torque, higher speed condition, in addition to the rotation control in a no-load, lower speed condition. With the exemplary embodiment, the control can be performed without depending on torque and a rotational speed, securing precision in the control at a level equivalent to a level in a control in a normal load, normal speed condition, even in a no-load, lower speed condition.

Figure 4:
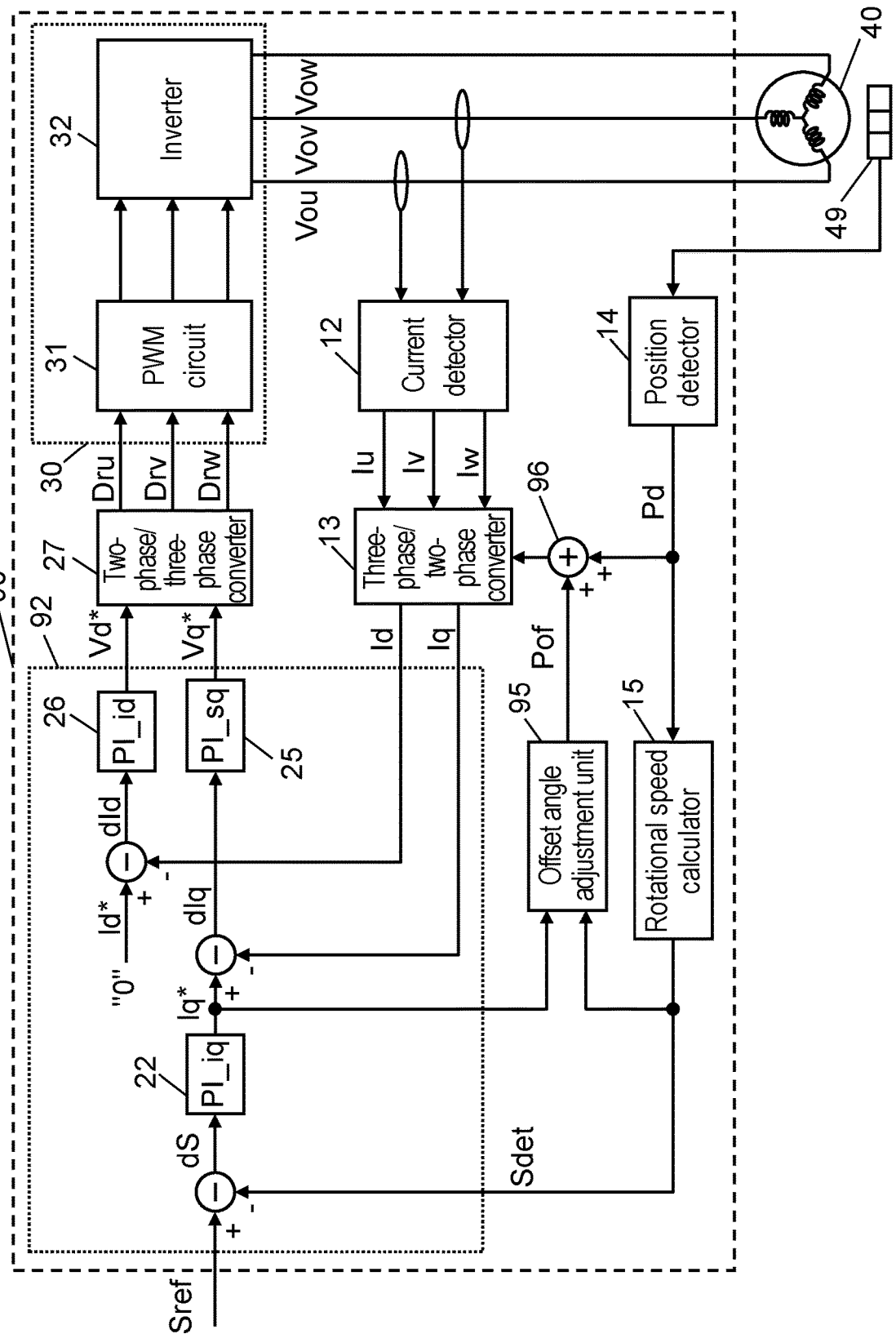
FIG. 4 is a block diagram illustrating a configuration of a conventional motor control device.

Further, as can be easily seen from a comparison between conventional vector control unit 92 illustrated in FIG. 4 and rotation control unit 20 according to the exemplary embodiment illustrated in FIG. 1, rotation control unit 20 according to the exemplary embodiment can be achieved in a simple configuration, compared with the ordinary current vector control method.

As described above, motor control device 10 according to the exemplary embodiment is configured so that d-axis voltage instruction generation unit 20d performs a current control with d-axis voltage instruction Vd* generated based on PI computation performed on d-axis current deviation dId, while q-axis voltage instruction generation unit 20q performs a voltage control with q-axis voltage instruction Vq* generated based on PI computation performed on speed deviation dS. The exemplary embodiment configured as described above can secure precision in the controls at a level equivalent to a level in a control in a normal load, normal speed condition, even in a no-load, lower speed condition. A rotation control can also be precisely performed in a no-load, lower speed condition. This feature is advantageous for a motor of an electric oil pump in which a load and a required speed vary widely.

Second Exemplary Embodiment

Figure 2:
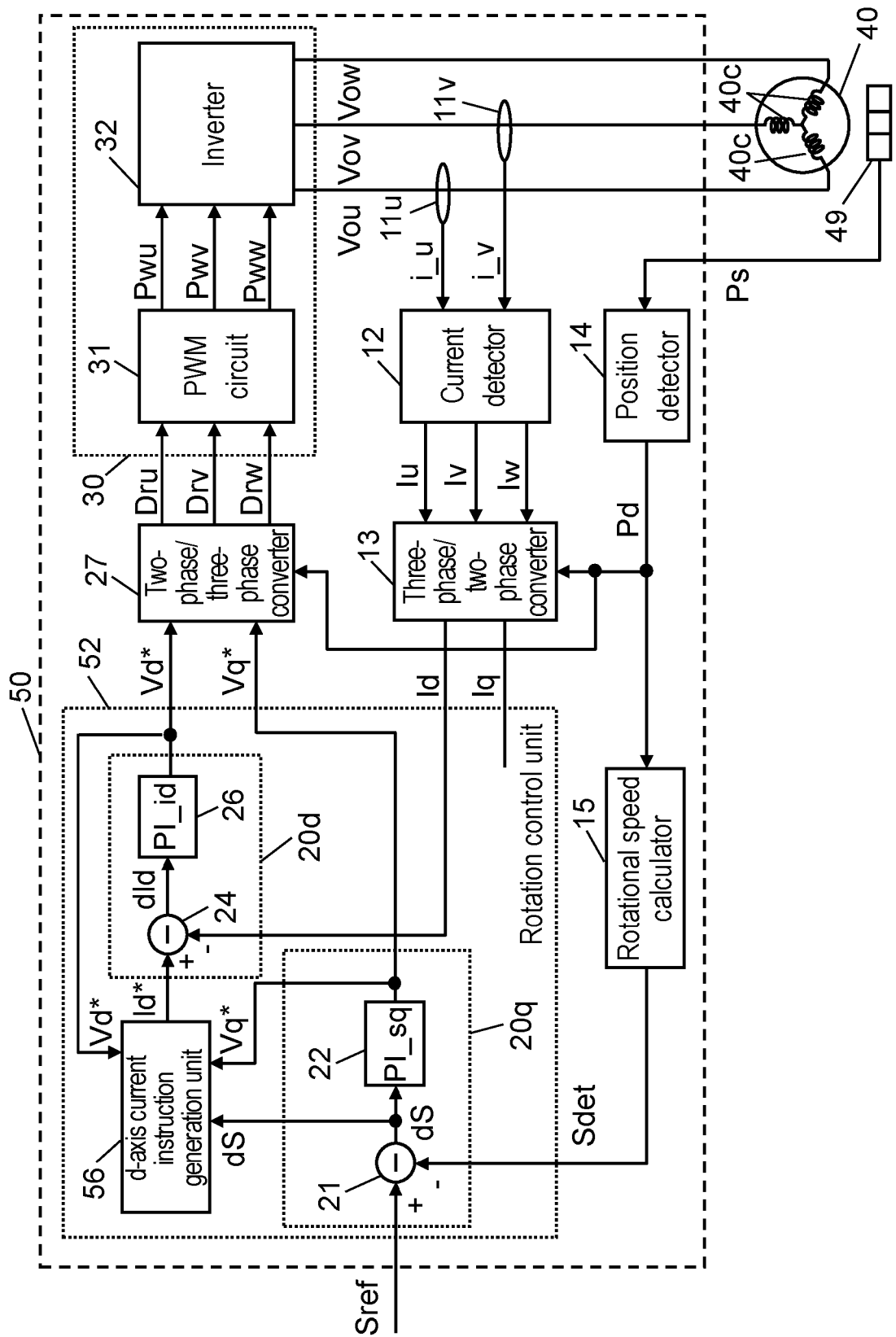
FIG. 2 is a block diagram illustrating a configuration of a motor control system including a motor control device according to a second exemplary embodiment of the present invention.

FIG. 2 is a block diagram of a motor control system including motor control device 50 according to a second exemplary embodiment of the present invention.

When compared with the first exemplary embodiment illustrated in FIG. 1, in motor control device 50 according to the exemplary embodiment, rotation control unit 52 further includes d-axis current instruction generation unit 56. More specifically, while d-axis current instruction Id* is specified to a fixed value, such as a value of "0" in the first exemplary embodiment, d-axis current instruction Id* is specified with a variable value in the exemplary embodiment. In FIG. 2, like reference numerals designate identical or corresponding components in FIG. 1. Detailed descriptions on such components are thus omitted.

The exemplary embodiment configured as described above is characterized in that d-axis current instruction generation unit 56 outputs d-axis current instruction Id* in accordance with a situation of rotation operation. The exemplary embodiment thus achieves highly efficient rotation operations at wider rotational speeds under various loads, compared with the first exemplary embodiment.

When a value of an external instruction increases during a vector control, for example, such phenomena might occur that a drive voltage based on the instruction exceeds a voltage of a power supply to a motor drive unit, and a duty ratio in a PWM control exceeds 100%. The above described phenomena are generally referred to as voltage saturation. Voltage saturation is caused by an induced voltage that rises in proportion to a rotational speed, and can easily occur as a rotational speed of a motor increases. When voltage saturation occurs, torque might lower. Such a flux weakening control is known that magnetic flux due to a permanent magnet is demagnetized to refrain an increase in induced voltage.

In the exemplary embodiment, d-axis current instruction generation unit 56 controls a d-axis current when voltage saturation occurs to prevent a decrease in efficiency.

As illustrated in FIG. 2, d-axis current instruction generation unit 56 is notified with speed deviation dS from q-axis voltage instruction generation unit 20q, as well as is notified with q-axis voltage instruction Vq* output from q-axis voltage instruction generation unit 20q and d-axis voltage instruction Vd* output from d-axis voltage instruction generation unit 20d. Based on the notified information, d-axis current instruction generation unit 56 generates and outputs d-axis current instruction Id*.

Figure 3:
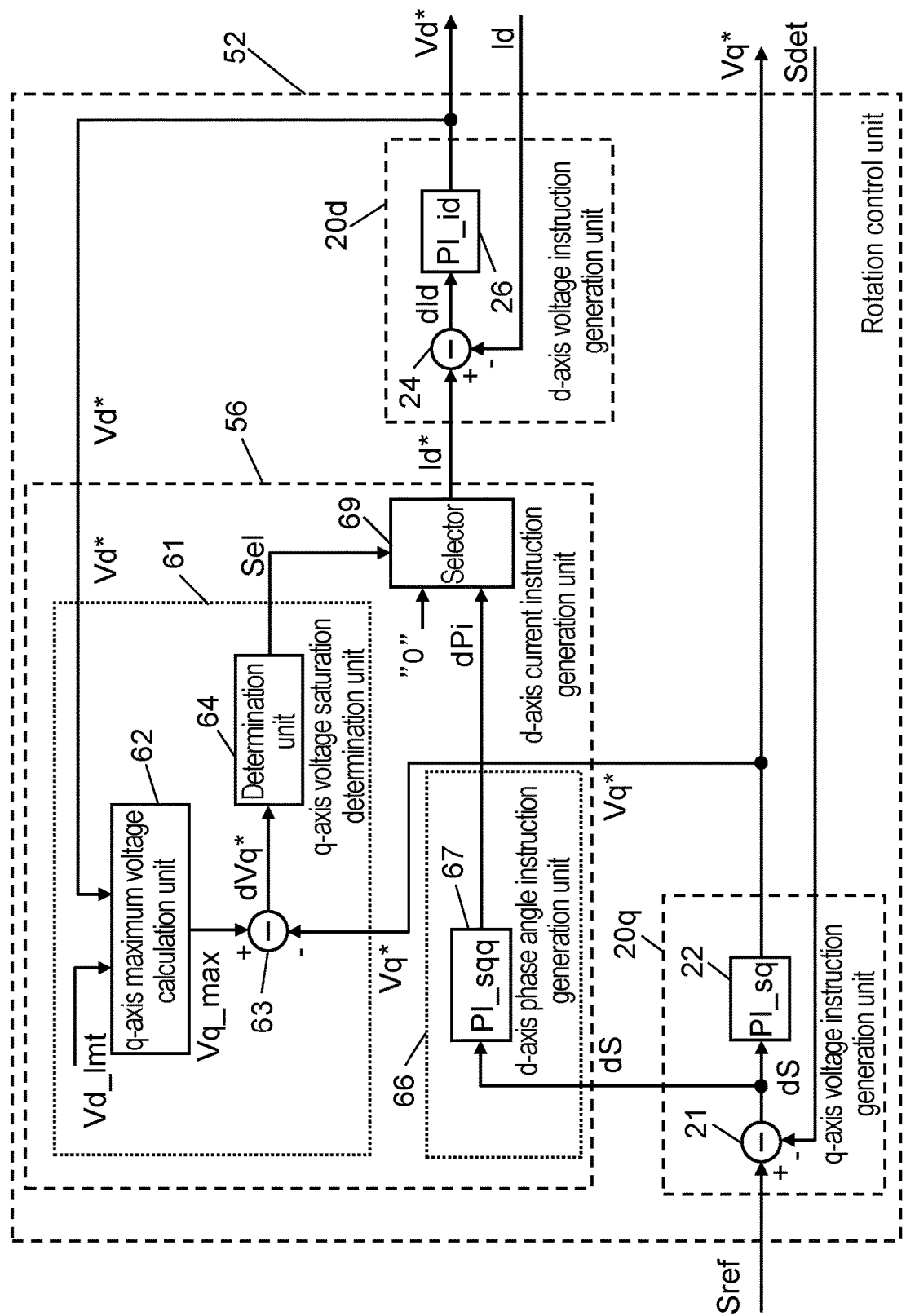
FIG. 3 is a block diagram illustrating a detailed configuration of a rotation control unit of the motor control device.

FIG. 3 is a block diagram illustrating a detailed configuration of rotation control unit 52 including d-axis current instruction generation unit 56 according to the exemplary embodiment.

As illustrated in FIG. 3, d-axis current instruction generation unit 56 includes q-axis voltage saturation determination unit 61, d-axis phase angle instruction generation unit 66, and selector 69. With the above described configuration, q-axis voltage saturation determination unit 61 determines whether voltage saturation as described above is occurring. To use as d-axis current instruction Id* when voltage saturation occurs, d-axis phase angle instruction generation unit 66 generates d-axis phase angle instruction dPi. When it is determined that voltage saturation is not occurring, in accordance with determination signal Sel indicative of a result of determination by q-axis voltage saturation determination unit 61, selector 69 selects a value of "0" as a fixed value, similar to the first exemplary embodiment. When it is determined that voltage saturation is occurring, selector 69 selects and outputs d-axis phase angle instruction dPi as d-axis current instruction Id*.

In the exemplary embodiment, to determine that voltage saturation has occurred, and to control a current on the d-axis, a q-axis voltage is utilized, as is utilized by q-axis voltage saturation determination unit 61. To achieve this, q-axis voltage saturation determination unit 61 includes q-axis maximum voltage calculation unit 62, subtractor 63, and determination unit 64.

In q-axis voltage saturation determination unit 61, q-axis maximum voltage calculation unit 62 first calculates, through computation, q-axis maximum instruction voltage Vq_max representing a maximum voltage that can be output as q-axis voltage instruction Vq* on the q-axis. To perform this calculation, q-axis maximum voltage calculation unit 62 is supplied with voltage limit value Vd_lmt that has been set beforehand, as well as is notified with d-axis voltage instruction Vd* from d-axis voltage instruction generation unit 20d. Voltage limit value Vd_lmt used herein denotes, with respect to a maximum voltage corresponding to a voltage value at which duty of PWM reaches 100%, a voltage value that limits a voltage equal to or above the maximum voltage, i.e., a voltage value at which duty of PWM reaches 95% or 98%, for example. By using voltage limit value Vd_lmt and d-axis voltage instruction Vd*, as described above, and by performing computation with Equation (1), q-axis voltage saturation determination unit 61 calculates q-axis maximum instruction voltage Vq_max.

[Equation 1]

$$Vq\_max = \sqrt{Vd\_lmt^2 - vd^{*2}} \quad \text{Equation (1)}$$

Next, in q-axis voltage saturation determination unit 61, subtractor 63 calculates difference dVq* between q-axis maximum instruction voltage Vq_max and q-axis voltage instruction Vq* output from q-axis voltage instruction generation unit 20q. Difference dVq* is then supplied to determination unit 64. Determination unit 64 determines whether to select either of d-axis phase angle instruction dPi and a value of "0" depending on a magnitude of difference dVq*. As difference dVq* becomes smaller, q-axis voltage instruction Vq* approaches q-axis maximum instruction voltage Vq_max. In such a rotation drive state, voltage saturation would occur. The exemplary embodiment utilizes a saturation state of a q-axis voltage, as described above, to allow determination unit 64 to determine, when difference dVq* lowers below a predetermined threshold value, that voltage saturation has occurred. That is, determination unit 64 controls selector 69 so as to select a value of "0" when difference dVq* is greater than the predetermined threshold value, and to select d-axis phase angle instruction dPi when difference dVq* lowers below the predetermined threshold value.

Speed deviation dS is notified from q-axis voltage instruction generation unit 20q to d-axis phase angle instruction generation unit 66. By allowing PI computation unit 67 to perform proportional integral (PI) computation on notified speed deviation dS, d-axis phase angle instruction generation unit 66 generates d-axis phase angle instruction dPi. In particular, in the configuration where, separately from PI computation unit 22 of q-axis voltage instruction generation unit 20q, PI computation unit 67 performs PI computation, d-axis phase angle instruction dPi conforming to a process to be performed when voltage saturation occurs is generated.

As described above, in the exemplary embodiment, upon q-axis voltage saturation determination unit 61 determines that voltage saturation has occurred, d-axis phase angle instruction dPi based on speed deviation dS, as described above, is used as d-axis current instruction Id*. That is, when q-axis voltage instruction Vq* is greater, a current control is performed under d-axis current instruction Id* corresponding to speed deviation dS on the d-axis. The d-axis is thus also controlled so that a current value in accordance with d-axis current instruction Id* is acquired, achieving a rotation control at an angle in accordance with phase angle instruction dPi on the d-q-axis, as can be seen in an advance angle control. Briefly speaking, the exemplary embodiment configured as described above performs the flux weakening control, as described above, by performing a rotation control at a phase angle in accordance with speed deviation dS during higher torque driving. The exemplary embodiment outputs, when voltage saturation occurs, d-axis current instruction Id* based on speed deviation dS, as described above. Therefore, while a minimum d-axis current is maintained, a speed in accordance with speed instruction Sref can be attained, achieving a highly efficient rotation operation with various rotational speeds under various loads.

The examples configured in accordance with functional blocks illustrated in FIGS. 1 to 3 have been described. However, a microcomputer may be utilized to configure the above described exemplary embodiments. That is, such a configuration may be adopted that incorporates the above described functions of rotation control unit 20, rotation control unit 52, three-phase/two-phase converter 13, two-phase/three-phase converter 27, PWM circuit 31, position detector 14, and rotational speed calculator 15 into a program executing a motor control method to execute the above described processes.

INDUSTRIAL APPLICABILITY

The motor control device and the motor control method according to the present invention can perform a stable rotation control even in a no-load, lower speed condition. Therefore, the present invention is advantageous for a motor control device configured to control a brushless motor, as well as for a motor control device configured to control a motor of an electric oil pump for which a precise motor control is required even in a lower torque, lower speed condition, for example.

REFERENCE MARKS IN THE DRAWINGS 10, 50, 90 motor control device
11u, 11v current sensor
12 current detector
13 three-phase/two-phase converter
14 position detector
15 rotational speed calculator
20, 52 rotation control unit
20d d-axis voltage instruction generation unit
20q q-axis voltage instruction generation unit
21, 24, 63 subtractor 22, 25, 26, 67 PI computation unit
27 two-phase/three-phase converter
30 motor drive unit
31 PWM circuit
32 inverter
40 motor
40c coil
49 position detection sensor
56 d-axis current instruction generation unit
61 q-axis voltage saturation determination unit
62 q-axis maximum voltage calculation unit
64 determination unit
66 d-axis phase angle instruction generation unit
69 selector
92 vector control unit
95 offset angle adjustment unit
96 adder

The invention claimed is:

1. A motor control device configured to perform a rotation control on a motor including a stator including coils in three, UVW phases of a U phase, a V phase, and a W phase, and a rotor rotatably disposed so as to face the stator, the rotor holding permanent magnets, by utilizing a dq-axis coordinate system including a d-axis corresponding to a magnetic pole position direction of the permanent magnets and a q-axis orthogonal to the d-axis, the motor control device comprising:

a two-phase/three-phase converter configured to receive a d-axis voltage instruction and a q-axis voltage instruction as voltage instruction values on the dq-axis coordinate, at which voltages are to be applied to the coils, and to convert the d-axis voltage instruction and the q-axis voltage instruction into drive voltage instructions in the UVW phases;

a power width modulation (PWM) circuit configured to generate drive pulse signals in the UVW phases, the drive pulse signals being undergone pulse width modulation per phase, in accordance with the supplied drive voltage instructions in the UVW phases;

an inverter configured to generate drive voltages in the UVW phases for driving the coils per phase based on the supplied drive pulse signals in the UVW phases;

a position detector configured to detect a rotational position of the rotor;

a rotational speed calculator configured to calculate a rotational speed of the rotor;

a current detector configured to detect drive currents flowing into the coils in the UVW phases;

a three-phase/two-phase converter configured to convert current values of the drive currents in the UVW phases, the drive currents being detected by the current detector, into a d-axis current value and a q-axis current value on the dq-axis coordinate;

a d-axis voltage instruction generation unit configured to generate the d-axis voltage instruction; and a q-axis voltage instruction generation unit configured to generate the q-axis voltage instruction, wherein the d-axis voltage instruction generation unit is further configured to acquire a difference between the d-axis current value and a d-axis current instruction having a predetermined value, and to generate the d-axis voltage instruction based on proportional integral (PI) computation performed on the difference, and wherein the q-axis voltage instruction generation unit is further configured to acquire a difference between a supplied speed instruction and the rotational speed calculated by the rotational speed calculator, and to generate the q-axis voltage instruction based on PI computation performed on the difference.

2. The motor control device according to claim 1, wherein the predetermined value of the d-axis current instruction is specified to 0.

3. The motor control device according to claim 1, further comprising a d-axis current instruction generation unit configured to generate the predetermined value for the d-axis current instruction, wherein the d-axis current instruction generation unit includes:

a q-axis voltage saturation determination unit configured to determine whether voltage saturation is occurring;

a d-axis phase angle instruction generation unit configured to generate a d-axis phase angle instruction to be used as the d-axis current instruction when the voltage saturation occurs; and a selector configured to select and output, as the d-axis current instruction, either of a fixed value and the d-axis phase angle instruction in accordance with a determination by the q-axis voltage saturation determination unit, wherein the predetermined value of the d-axis current instruction is specified to a value output by the selector.

4. A motor control method for a motor control device, the motor control device including:

a PWM circuit configured to perform a rotation control on a motor including a stator including coils in three, UVW phases of a U phase, a V phase, and a W phase, and a rotor rotatably disposed so as to face the stator, the rotor holding permanent magnets, by utilizing a dq-axis coordinate system including a d-axis corresponding to a magnetic pole position direction of the permanent magnets and a q-axis orthogonal to the d-axis; and to generate drive pulse signals in the UVW phases, the drive pulse signals being undergone pulse width modulation per phase, in accordance with supplied drive voltage instructions in the UVW phases;

an inverter configured to generate drive voltages in the UVW phases for driving the coils per phase based on the supplied drive pulse signals in the UVW phases;

a position detector configured to detect a rotational position of the rotor;

a rotational speed calculator configured to calculate a rotational speed of the rotor;

a current detector configured to detect drive currents flowing into the coils in the UVW phases; and a three-phase/two-phase converter configured to convert current values of the drive currents in the UVW phases, the drive currents being detected by the current detector, into a d-axis current value and a q-axis current value on the dq-axis coordinate, the motor control method comprising:

a step of acquiring a difference between the d-axis current value and a d-axis current instruction having a predetermined value, and of generating the d-axis voltage instruction based on PI computation performed on the difference;

a step of acquiring a difference between a supplied speed instruction and the calculated rotational speed, and of generating the q-axis voltage instruction based on PI computation performed on the difference; and a step of converting the d-axis voltage instruction and the q-axis voltage instruction into the drive voltage instructions in the UVW phases.

5. The motor control method according to claim 4, wherein the predetermined value of the d-axis current instruction is specified to 0.

6. The motor control method according to claim 4, further comprising:
- a step of determining whether voltage saturation is occurring;
- a step of generating a d-axis phase angle instruction to be used as the d-axis current instruction when the voltage saturation occurs; and
- a step of selecting and outputting, as the predetermined value for the d-axis current instruction, either of a fixed value and the d-axis phase angle instruction in accordance with a determination of whether the voltage saturation is occurring.

* * * * *